(12) United States Patent
Watanabe et al.

(10) Patent No.: US 8,776,451 B2
(45) Date of Patent: Jul. 15, 2014

(54) EXTENDIBLE STRUCTURE

(75) Inventors: Akihito Watanabe, Sakai (JP); Hiroaki Ito, Sakai (JP); Toshiyuki Hori, Sakai (JP); Nobuyoshi Kawabata, Sakai (JP)

(73) Assignee: Sakase Adtech Co., Ltd., Sakai-Shi (JP)

( * ) Notice: Subject to any disclaimer, the term of this patent is extended or adjusted under 35 U.S.C. 154(b) by 492 days.

(21) Appl. No.: 13/126,880

(22) PCT Filed: Nov. 5, 2009

(86) PCT No.: PCT/JP2009/068895
§ 371 (c)(1),
(2), (4) Date: Jul. 8, 2011

(87) PCT Pub. No.: WO2010/053117
PCT Pub. Date: May 14, 2010

(65) Prior Publication Data
US 2011/0253827 A1    Oct. 20, 2011

(30) Foreign Application Priority Data
Nov. 5, 2008  (JP) .................. 2008-284301

(51) Int. Cl.
E04H 12/34 (2006.01)
H01Q 1/08 (2006.01)
H01Q 1/12 (2006.01)
E04H 12/18 (2006.01)
E04H 15/20 (2006.01)

(52) U.S. Cl.
CPC ............. *H01Q 1/087* (2013.01); *H01Q 1/1235* (2013.01); *E04H 12/185* (2013.01); *E04H 15/20* (2013.01)
USPC ............................... 52/108; 52/632; 182/69.4

(58) Field of Classification Search
CPC ...... E04H 12/185; E04H 15/20; H01Q 1/087; H01Q 1/235

USPC ............... 52/108, 632, 2.11, 2.13, 2.18, 2.21, 52/2.23, 2.26; 182/41, 69.4; 242/566, 918
See application file for complete search history.

(56) References Cited

U.S. PATENT DOCUMENTS 1,531,982 A * 3/1925 Sago ............................. 182/41
3,360,894 A * 1/1968 Orr et al. ........................ 52/108
(Continued)

FOREIGN PATENT DOCUMENTS

DE    1 205 256 B    11/1965
DE    40 26 936 C1    1/1992
(Continued)

OTHER PUBLICATIONS

Japanese Office Action dated Jan. 29, 2013.
(Continued)

*Primary Examiner* — William Gilbert
*Assistant Examiner* — Alp Akbasli
(74) *Attorney, Agent, or Firm* — Burr & Brown, PLLC (57) ABSTRACT

An extendible structure which includes an elongated extendible member having elasticity, and a storage part that serves to store the extendible member by winding it up, wherein a tip end of the extendible member can be extended from the storage part in a one-dimensional manner, so that an extendible part thus extended becomes a hollow tubular structure. The extendible member is composed of three divided extendible members so that the extendible part of the hollow tubular structure is divided into three parts, and the individual divided extendible members are constructed such that their tip end portions are joined with one another, and at the same time, their base end portions are wound around individual storage parts, respectively, independently from each other. Surface fasteners are each provided on a side of each of the divided extendible members.

11 Claims, 5 Drawing Sheets

(56) References Cited

U.S. PATENT DOCUMENTS

| | | | | |
|---|---|---|---|---|
| 4,047,339 | A | * | 9/1977 | Smith et al. ............... 52/108 |
| 4,265,690 | A | * | 5/1981 | Lowenhar .................. 156/161 |
| 4,386,485 | A | * | 6/1983 | Kramer ..................... 52/108 |
| 4,651,480 | A | * | 3/1987 | Kramer ..................... 52/108 |
| 5,056,278 | A | * | 10/1991 | Atsukawa ................. 52/108 |
| 5,451,975 | A | * | 9/1995 | Miller et al. .............. 343/915 |
| 6,112,474 | A | * | 9/2000 | Paine ....................... 52/108 |
| 6,571,914 | B2 | * | 6/2003 | Lee et al. .................. 182/69.4 |
| 6,956,696 | B2 | * | 10/2005 | Hachkowski et al. ...... 359/399 |
| 7,621,078 | B2 | * | 11/2009 | Phelan et al. .............. 52/121 |
| 8,042,305 | B2 | * | 10/2011 | Pryor et al. ............... 52/121 |
| 8,303,143 | B2 | * | 11/2012 | Webb ....................... 362/413 |
| 2005/0094264 | A1 | | 5/2005 | Hachkowski et al. |

FOREIGN PATENT DOCUMENTS

| | | |
|---|---|---|
| FR | 2 905 804 A1 | 3/2008 |
| JP | 09-307339 A1 | 11/1997 |
| JP | 2000-128100 A1 | 5/2000 |
| JP | 2000-507890 A1 | 6/2000 |
| JP | 2002-516805 A1 | 6/2002 |
| JP | 2005-195066 A1 | 7/2005 |
| JP | 2006-130988 A1 | 5/2006 |
| WO | 97/35706 A1 | 10/1997 |
| WO | 99/62811 A1 | 12/1999 |

OTHER PUBLICATIONS

Extended European Search Report dated Jun. 19, 2012.

* cited by examiner

EXTENDIBLE STRUCTURE

BACKGROUND OF THE INVENTION

1. Field of the Invention

The present invention relates to an extendible or deployable structure which is used by being extended or deployed in outer space, such as, for example, an antenna of an artificial satellite.

2. Description of Related Art

As a conventional extendible or deployable structure, there has been known a structure called an STEM (Storable Tubular Extendible Member) as described in a first patent document, for example.

This extendible structure is constructed to include an elongated extendible member having elasticity, and a storage part that serves to store the extendible member by winding it up, wherein a tip end of the extendible member can be extended from the storage part in a one-dimensional manner, so that an extendible part thus extended becomes a hollow tubular structure.

In this first patent document, by previously forming the transverse cross-sectional shape (i.e., the cross section in a direction orthogonal to an extending direction) of a sheet of elongate extendible member into a circular shape, winding it around the storage part while elastically deforming it into a flat shape, and pulling out the tip end portion thereof from the storage part, the cross-sectional shape of the extendible member is caused to elastically return to the circular shape, whereby the extendible part is made into the hollow tubular structure. Hereinafter, such a structure using a sheet of extendible member is referred to as a Uni-STEM structure.

PRIOR ART REFERENCES

Patent Documents

[First Patent Document] Japanese patent application laid-open No. 2006-130988

SUMMARY OF THE INVENTION

However, the position of the center of gravity of the extendible structure of this Uni-STEM structure changes at the time of extension during the course in which the extendible part extends from a flat storage form to an extension form of a round tubular shape, so it is difficult to make the extendible structure extend in a stable manner. In particular, in outer space, it is important to stabilize the position of the center of gravity of the extendible structure.

In addition, the extendible structure, though extending in a one-dimensional manner, is easy to warp, and highly accurate straightness thereof is not obtained. In order to ensure the straightness of the extendible structure, it is only necessary to restrain a root portion thereof, but the root portion changes its shape from a flat open form to a tubular extension form in a complicated manner, so it is difficult to restrain the root portion, and hence the shape of the root portion has to be in a free state, thus making it difficult to ensure the straightness thereof.

Moreover, the extendible part, though being of a tubular cross section, has an open cross-sectional structure in which the sides of extendible member are simply overlapped with each other, so its bending stiffness or flexural rigidity is low, and its compressive strength is weak, too.

Further, a space in a lengthwise direction is required, which corresponds to the length of a process in which the shape of the root portion changes from the flat shape to the circular tubular shape, as a result of which storability in the lengthwise direction thereof becomes worse.

In addition, in the storage part, the extendible member is deployed into the flat shape, so the storage part becomes large in width, and storability in a widthwise direction thereof also becomes worse. Moreover, because the curvature in the cross-sectional direction of the extendible member becomes large, the material thereof is easy to settle or sink down, and edges thereof are easy to be damaged due to the application of load.

On the other hand, there has also been studied an extendible structure of a Bi-STEM structure in which an extendible member is composed of two divided extendible members so that an extendible part of a hollow tubular structure is divided into two parts, and it is constructed such that the tip end portions of the respective divided extendible members are joined with each other, and at the same time, their base end portions are wound around storage parts, respectively, independently from each other.

If such a Bi-STEM structure is adopted, it will be advantageous in that the change of the position of the center of gravity thereof during the course extending from a storage form to an extension form becomes small, but the shape of a root portion will be difficult to be restrained to a greater or lesser extent, so it will become unstable, thus making it difficult to ensure the straightness thereof.

Accordingly, it has been investigated that the two divided extendible members are joined to each other to form a closed cross-sectional structure by a fastening means, but depending upon the balance of the fastening means, a curve or warp is generated to either side of the two divided extendible members, resulting in not so much improvement in straightness.

In addition, even in the case of the Bi-STEM structure, a certain length is required, too, in the process in which the shape of the root portion changes from a flat form to a circular tubular form, and hence the storability in the lengthwise direction thereof is bad.

The present invention has been made in view of these actual circumstances, and has for its object to provide an extendible structure which is able to ensure mechanical strength as a structural body, and which is still able to ensure straightness thereof.

In order to achieve the above-mentioned object, the present invention resides in an extendible structure which includes an elongated extendible member having elasticity, and a storage part that serves to store the extendible member by winding it up, wherein a tip end of the extendible member can be extended from the storage part in a one-dimensional manner, so that an extendible part thus extended becomes a hollow tubular structure, and which is characterized in that said extendible member is composed of three divided extendible members so that the extendible part of the hollow tubular structure is divided into three parts, and the individual divided extendible members are constructed such that their tip end portions are joined with one another, and at the same time, their base end portions are wound around the storage part independently from each other; and fastening units are each provided on a side of each of the divided extendible members, said fastening units being combined with one another to make the extendible part into a hollow structure of a closed cross section at the time of extension.

It is preferable that the fastening units be surface fasteners (or hook-and-loop fasteners).

It is preferable that the fastening units be each provided on an ear part that protrudes outwardly from the extendible part of a hollow tubular shape.

It is preferable that the divided extendible members be fiber-reinforced plastics which are strengthened by a fibrous substrate, and for example, textile is suitable for the fibrous substrate. The textile is preferably triaxial woven fabric.

Preferably, the fiber of the substrate is a fiber of high strength, high elasticity and low thermal expansion, and as the fiber of the substrate, there can be used at least any of carbon fiber, aramid fiber, PBO fiber, and silica glass fiber.

It is preferable that a matrix resin of the fiber-reinforced plastics be a thermosetting resin.

The divided extendible members can also be made of metal, and as the metal, there can be used beryllium-copper alloy.

As the fastening units, there can be used, other than the surface fasteners, at least any one of line fasteners, rail fasteners, magnets, latches, hooks, buttons, adhesion, and bonding.

According to an extendible structure of the present invention, at the time of extension, three divided extendible members extend while being mutually joined with one another, so in a process in which they extend from a storage form to an extension form, there is substantially no change of the position of the center of gravity thereof, thus making it possible to extend them in a stable manner.

In addition, the three divided extendible members extend while their sides being fixedly fastened to each other by means of the fastening units, so warpage thereof is difficult to occur, thus making it possible to obtain highly accurate straightness thereof.

Moreover, by fixedly fastening the divided extendible members at their root portions by means of the fastening units, the shape thereof can be restrained in the root portions, thereby making it possible to ensure the straightness thereof in a reliable manner.

The extendible part is made into a closed cross-sectional structure by means of the fastening units, so bending stiffness thereof can be made large.

Further, by fixing the extendible part at its root portion by means of the fastening units, the length of a process in which the extendible part changes from a flat shape to a circular tubular shape can be made small as much as possible, and hence the storability thereof in a lengthwise direction is good.

In addition, in the storage part, the extendible member is divided into three parts, so the width of each of the divided extendible members is narrow, and the storability thereof in the widthwise direction is also good. Moreover, the curvature in the cross-sectional direction of the extendible member can also be made smaller as compared with a Uni-STEM structure or a Bi-STEM structure, so that the permanent set in fatigue of a material thereof can be suppressed small as much as possible, and the load applied to edges thereof also becomes small.

DETAILED DESCRIPTION OF THE INVENTION

Hereinafter, an embodiment according to the present invention will be described in detail with reference to the accompanying drawings.

FIG. 1 through FIG. 4 are views showing an extendible structure according to an embodiment of the present invention.

Figure 1:
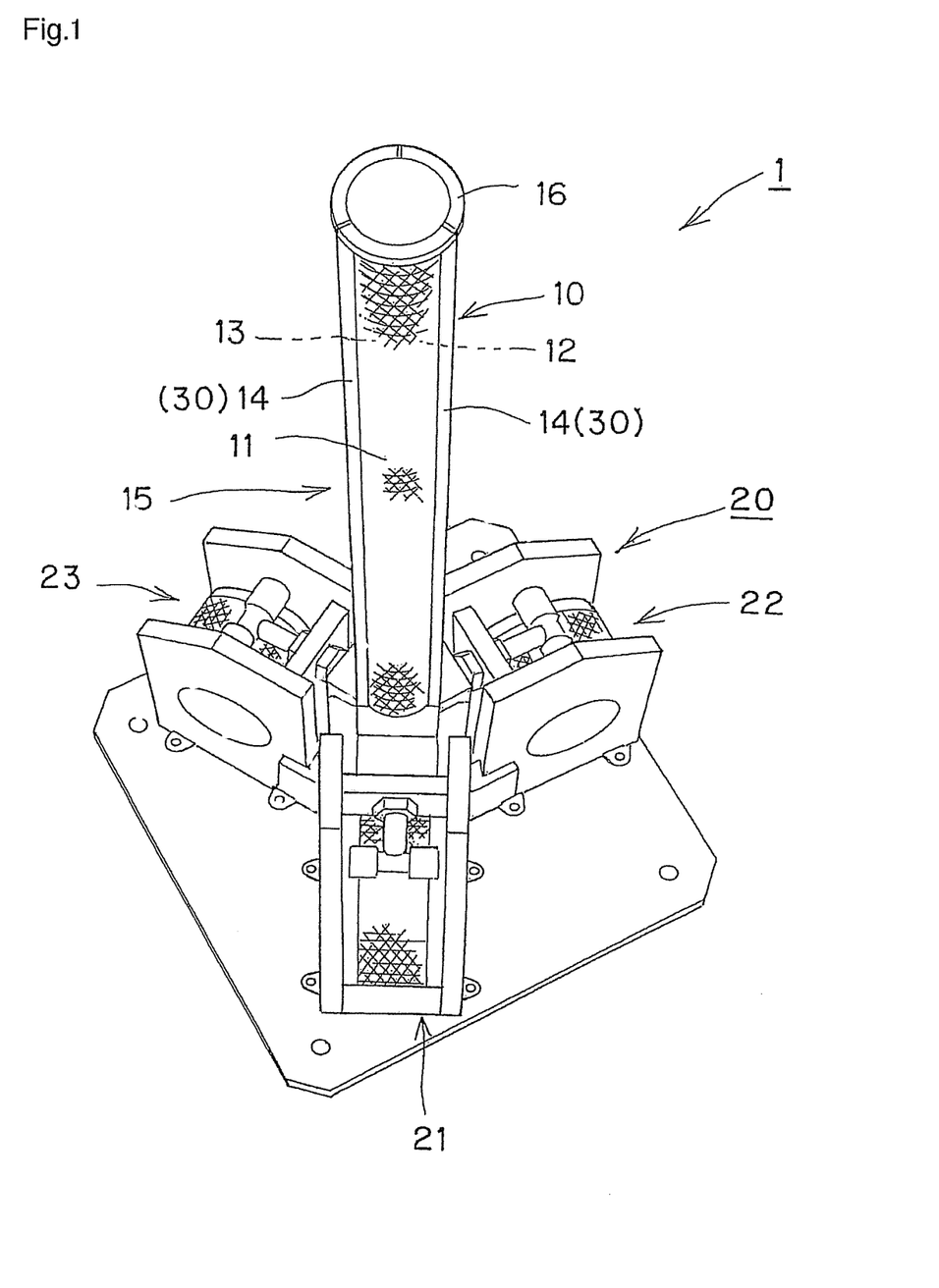
FIG. 1 is a schematic perspective view in which an extendible structure according to a first embodiment of the present invention is in an extended state.
Figure 2:
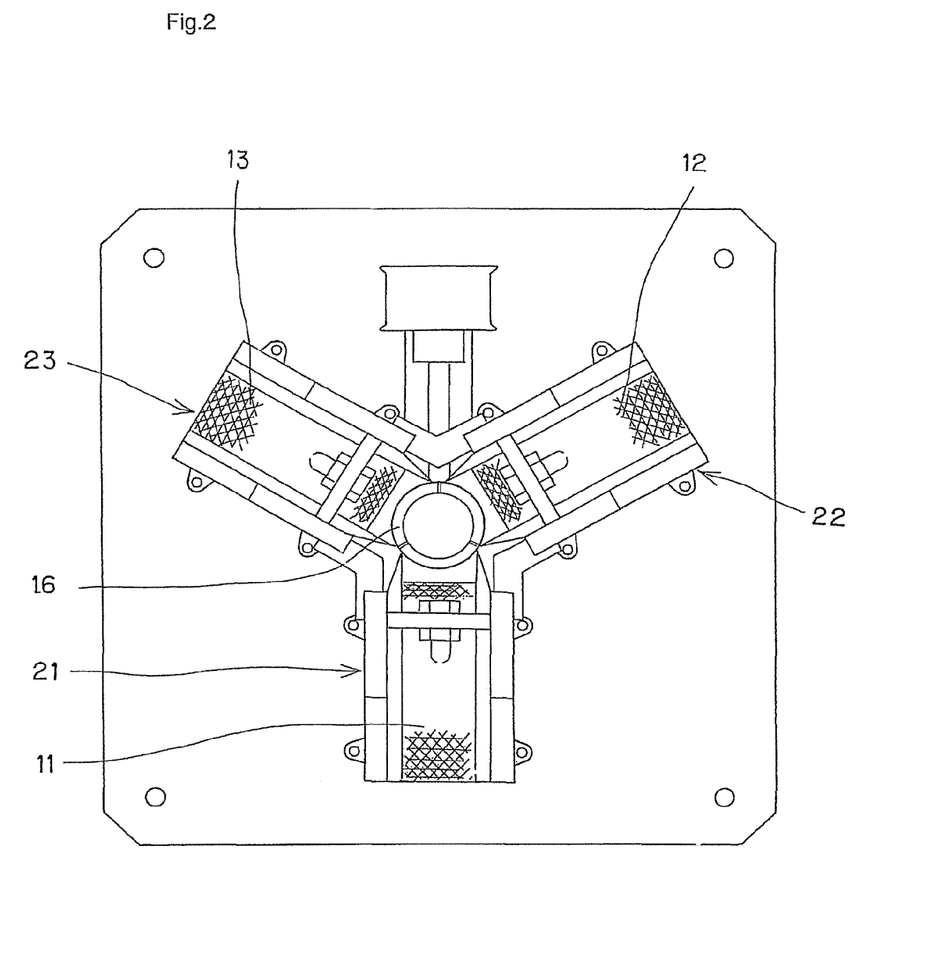
FIG. 2 is a top plan view of the extendible structure of FIG. 1.

That is, this extendible structure 1 is constructed to include an elongated extendible member 10 having elasticity, and a storage part 20 that serves to store this extendible member 10 by winding it up, wherein a tip end of the extendible member 10 can be extended from the storage part 20 in a one-dimensional manner, so that an extendible part 15 thus extended becomes a hollow tubular structure.

The extendible member 10 is composed of three divided extendible members 11, 12, 13 so that the extendible part 15 of the hollow tubular structure is divided into three parts, and the individual divided extendible members 11, 12, 13 are constructed such that their tip end portions are joined with one another by means of a cap-shaped tip end member 16, and at the same time, their base end portions are wound around individual divided storage parts 21, 22, 23, respectively, independently from each other.

Surface fasteners (or hook-and-loop fasteners) 30, which act as fastening units, are provided on opposite sides of each of the divided extendible members 11, 12, 13, the surface fasteners 30 being combined with one another to make the extendible part 15 into a hollow structure of a closed cross section at the time of extension.

Figure 4:
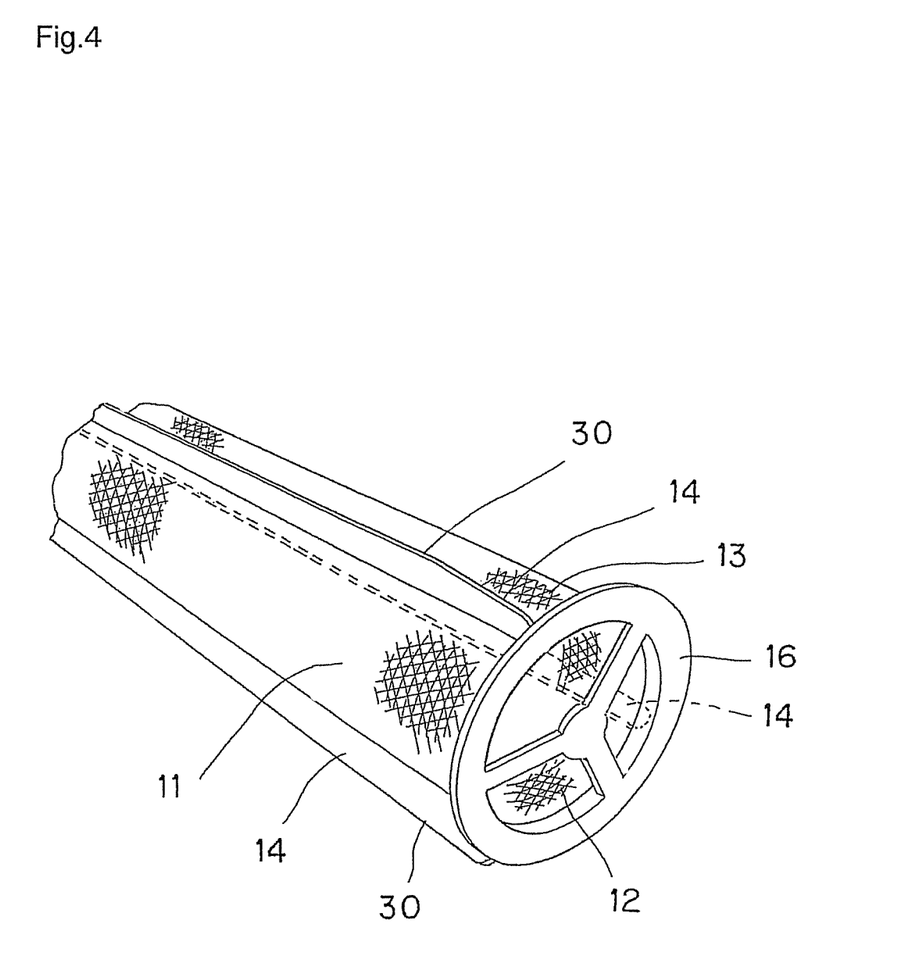
FIG. 4 is a perspective view of an extendible part of the extendible structure of FIG. 1.

In this example, the extendible part 15 of the hollow tubular structure has a circular tubular shape of a circular cross section, and the individual divided extendible members 11, 12, 13 are composed of arc-shaped elongated bodies which are formed by dividing the circumference of the hollow tubular structure into three equal parts in units of 120 degrees, as shown in FIG. 4. The surface fasteners 30 are provided on ear parts 14, respectively, which are formed on the opposite sides of each of the divided extendible members 11, 12, 13 over their entire length in the longitudinal direction. In the extendible part 15 of the hollow tubular shape, these ear parts 14 are mutually joined with each other in the circumferential direction thereof, and protrude outwardly with respect to the extendible part 15.

The divided extendible members 11, 12, 13 are formed of fiber-reinforced plastics strengthened by a fibrous substrate, i.e., in this example, of a triaxial woven fabric monolayer composite material.

As the fibrous substrate, there can be used textile (or woven fabric), knitting, and a uni-directional material with carbon fibers aligned only in one direction. As the textile, biaxial woven fabric in addition to triaxial woven fabric may also be applied.

In addition, as the fiber of the substrate, there is used a fiber of high strength, high elasticity and low thermal expansion, such as carbon fiber, aramid fiber, poly-p-phenylene benzobisoxazole (PBO) fiber of high strength and high heat resistance, silica glass fiber, and so on.

Also, as the matrix resin of the fiber-reinforced plastics, thermosetting resins such as epoxy based resins, polyimide based resins, etc., are suitable.

Figure 3:
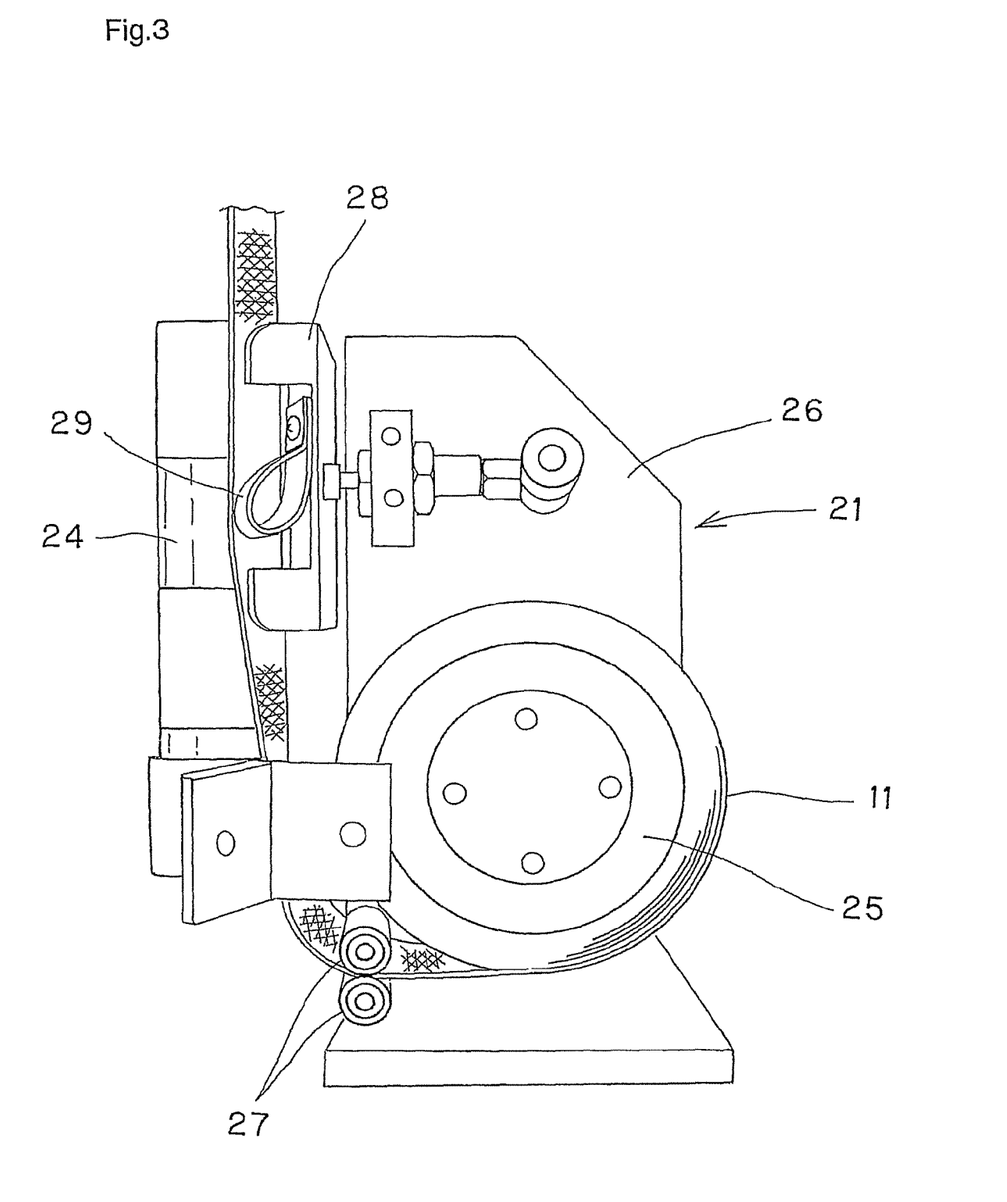
FIG. 3 is a view showing one storage part of FIG. 1 in a disassembled manner.

The divided storage parts 21, 22, 23 are arranged radially in three directions around a central inner guide 24 in such a manner that the divided extendible members 11 can be pulled out toward the outlet sides of the storage parts along the inner guide 24. The inner guide 24 is in the shape of a pipe, with an inflator tube received therein. Because the three divided storage parts 21, 22, 23 are of the same structure, only one divided storage part 21 will be explained below. As shown in FIG. 3, the divided storage part 21 is provided with a wind-up drum 25 that winds up the divided extendible member 11, a guide wall 26 that supports the wind-up drum 25 so as to be rotatable relative thereto, root guide rollers 27 that serve to pull out the divided extendible member 11 from the wind-up drum 25, an extension guide 28 that is arranged at the outlet side of the divided storage part in a manner to extend in an extension direction, and a resilient presser member 29 that is attached to the extension guide 28 so as to press a related surface fastener 30.

In this example, the extendible member 10 is caused to extend by an inflator tube, though not particularly illustrated, which is forced to expand in the extension direction by means of gas pressure. In this connection, however, there may be adopted a motor drive system in which the divided extendible members are each clamped by rollers so as to be driven thereby in synchronization with one another.

Though not particularly illustrated, each surface fastener 30 is composed of a female fastener piece that is provided with a multitude of loops, and a male fastener piece that has a multitude of hooks engageable with these loops, wherein the male and female fastener pieces are attached to the ear parts 14, 14 at the mutually adjacent sides of the individual divided extendible members 11, 12, 13, so that they can be engaged with and disengaged from each other.

In this embodiment, the individual divided extendible members 11, 12, 13 in their storage states are stored in the individual divided storage parts 21, 22, 23, respectively, while having been wound up around the wind-up drums 25, respectively. At the time of storage, the tip end member 16 which connects the tip ends of the individual divided extendible members 11, 12, 13 with one another is located at an exit of the storage part 20.

When the unillustrated inflator tube is caused to expand in this state, the tip end member 16 of the extendible member 10 is pushed by the inflator tube, whereby the divided extendible members 11, 12, 13 are pulled out toward the central side along the root guide rollers 27, so that their outer peripheral sides are guided by the exit side extension guides 28 and their inner peripheral sides move to the exit side along the outer periphery of the central inner guide 24.

Then, the ear parts 14 on the sides of the mutually adjacent divided extendible members 11, 12, 13 are mutually pushed to each other by the presser members 29, so that the surface fasteners 30 attached to the ear parts 14 are joined to each other, though not particularly illustrated, by means of engagement of the hooks of each male side surface fastener with the loops of each corresponding female side surface fastener. Accordingly, in a state where the divided extendible members come out of the divided storage parts 21, 22, 23, they are caused to extend in a one-dimensional way after having already become the form of the extendible part 15 of a hollow tubular shape.

In addition, because use is made of such surface fasteners 30, extension and storage can be carried out in a reversible manner. In the case of storage, the divided extendible members 11, 12, 13 can be wound up to be stored, for example, by causing reverse rotation of the rollers which are held in pressure contact with the divided extendible members.

In this manner, according to the extendible structure of the present invention, at the time of extension, the three divided extendible members 11, 12, 13 extend while being mutually joined to one another, so in a process in which they extend from the storage form to the extendible part 15 (i.e., the extension form), there is substantially no change of the position of the center of gravity thereof, thus making it possible to extend them in a stable manner.

Moreover, the three divided extendible members 11, 12, 13 are joined to one another in directions to mutually push against each other toward the center from three directions by means of the surface fasteners 30, so they are joined to one another in a well-balanced manner, whereby they extend straight along the axial direction in a stable manner with no inclination.

In addition, because the divided extendible members 11, 12, 13 are fixed in the root portion of the storage part 20 by means of the surface fasteners 30, the shape thereof can be restrained in the root portion, thereby making it possible to ensure the straightness thereof in a reliable manner.

Although a conventional Uni-STEM or Bi-STEM structure is of an open cross-sectional shape, the present invention makes the three divided extendible members into a closed cross section by fixedly fastening them to each other by means of the surface fasteners 30, so instability of physical properties such as straightness, bending stiffness, and so on can be eliminated.

That is, the extendible part 15 has a closed cross-sectional structure formed by means of the surface fasteners 30, so it has high bending stiffness, and is highly resistant to a bending moment. In addition, the mechanical strength thereof such as compressive strength is high.

Further, by fixing the extendible part 15 at its root portion by means of the surface fasteners 30, the length of the process in which the extendible part 15 changes from a flat shape to a tubular shape can be made small as much as possible, and the storability thereof in the lengthwise direction is good.

In addition, in the storage part 20, the extendible member is divided into three parts, so the width of each of the divided extendible members 11, 12, 13 is narrow, and the storability thereof in the widthwise direction is also good. Moreover, the curvature in the cross-sectional direction of each of the divided extendible members 11, 12, 13 can also be made small as much as possible as compared with the Uni-STEM structure or the Bi-STEM structure, so that the permanent set in fatigue of materials thereof can be suppressed small as much as possible, and the load applied to edges thereof also becomes small.

Figure 5:
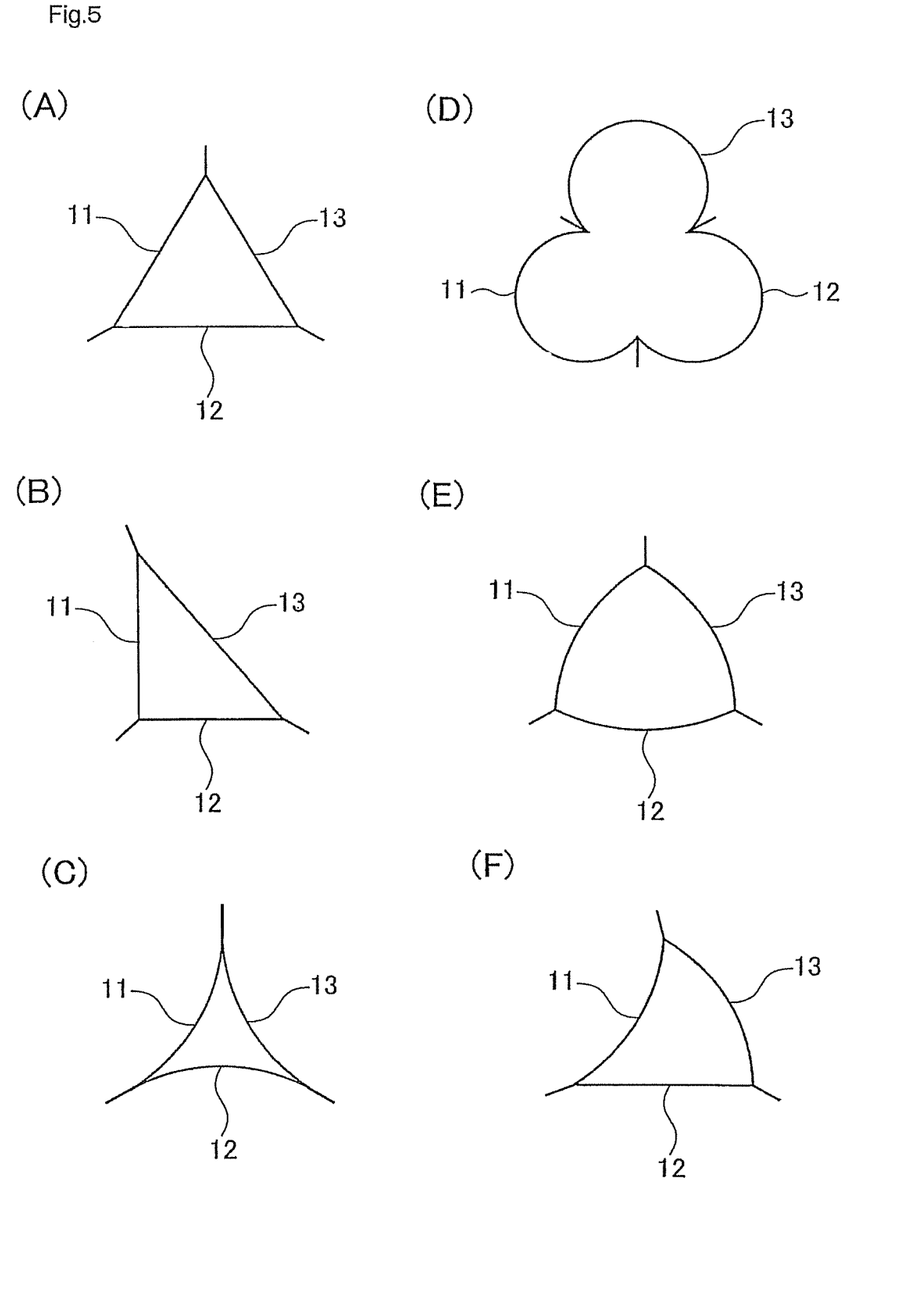
FIGS. 5(A) through 5(F) are views showing other examples of the transverse cross-sectional shape of the extendible part of a hollow structure of FIG. 1.

In the above-mentioned embodiment, the cross-sectional shape of the extendible part is a circular cross section, but it is not limited to such a circular cross section, and various cross-sectional shapes can be selected, as shown in FIGS. 5(A) through 5(F). That is, FIG. 5(A) shows a cross section of a triangular shape; FIG. 5(B) shows a cross section of a right angled triangle; FIG. 5(C) shows a cross section of a triangular shape with its three sides being curved to be concave toward its center; FIG. 5(E) shows a cross section of a triangular shape with its three sides being curved to be convex outwards; FIG. 5(D) shows a petal shape with its three sides being swelled; and FIG. 5(F) shows a closed cross-sectional shape which has three sides composed of a straight line, a convex curve, and a concave curve. Of course, the cross-sectional shapes are not limited to these shapes, but can be made into other forms.

In addition, in the above-mentioned embodiment, an explanation has been made about an example in which fiber-reinforced plastics are used as the divided extendible members, but the divided extendible members are not limited to the example, and a metal having elasticity such as, for example, beryllium copper alloy, etc., can be used.

Further, an example has been shown in which the surface fasteners are used as the fastening units, but there can instead be used a variety of kinds of fastening units, as long as they can form a closed cross-sectional structure, such as, so-called, line fasteners, rail fasteners, magnets, latches, hooks, buttons, adhesion, bonding, etc. The line fasteners are so-called zippers, in which mutually engageable element teeth, being mounted on a pair of tapes, are placed into or out of meshing engagement with each other by means of a slider. In addition, the rail fasteners are such that a pair of rails, instead of element teeth, are placed into or out of engagement with each other by means of a slider.

Here, note that an extendible structure according to the present invention is not limited to the above-mentioned embodiment, but can of course be subjected to various changes and modifications within the scope not departing from the gist of the present invention.

EXPLANATION OF REFERENCE NUMERALS AND CHARACTERS 1 extendible structure
10 extendible member
11, 12, 13 divided extendible members
14 ear parts
15 extendible part
16 tip end member
20 storage part
21, 22, 23 divided storage parts
24 inner guide
25 wind-up drums
26 guide wall
27 root guide rollers
28 extension guides
29 presser members
30 surface fasteners

The invention claimed is:

1. An extendible structure which includes an elongated extendible member having elasticity, and a storage part that serves to store the extendible member by winding it up, wherein a tip end of the extendible member can be extended from the storage part in a one-dimensional manner, so that an extendible part thus extended becomes a hollow tubular structure,
wherein said extendible member is composed of three divided extendible members with arc-shaped elongated bodies so that the extendible part of the hollow tubular structure has a circular tubular shape and is divided into three parts in a circular cross section, and the individual divided extendible members are constructed such that their tip end portions are joined with one another, and at the same time, their base end portions are wound around divided storage parts independently from each other; and
wherein surface fasteners are provided on ear parts, with the car parts being formed on opposite sides of each of the divided extendible members over the entire length of the divided extendible members in a longitudinal direction, said surface fasteners being combined with one another to make the extendible part into a hollow structure of a closed cross section at the time of extension,
wherein the divided storage parts are arranged radially in three directions around a central inner guide in such a manner that the divided extendible members can be pulled out toward the outlet sides of the divided storage parts along the inner guide, with each divided storage part provided with an extension guide arranged at the outlet side of the divided storage part in such a manner so as to extend in an extension direction, and
wherein a resilient presser member is attached to the extension guide so as to press said surface fasteners.

2. The extendible structure as set forth in claim 1, wherein the divided extendible members are fiber-reinforced plastics which are strengthened by a fibrous substrate.

3. The extendible structure as set forth in claim 1, wherein the fibrous substrate is textile.

4. The extendible structure as set forth in claim 3, wherein the textile is triaxial woven fabric.

5. The extendible structure as set forth in claim 2, wherein a fiber of the substrate is a fiber of high strength, high elasticity and low thermal expansion.

6. The extendible structure as set forth in claim 5, wherein as the fiber of the substrate, there is used at least any of carbon fiber, aramid fiber, PBO fiber, and silica glass fiber.

7. The extendible structure as set forth in claim 2, wherein a matrix resin of the fiber-reinforced plastics is a thermosetting resin.

8. The extendible structure as set forth in claim 1, wherein the divided extendible members are made of metal.

9. The extendible structure as set forth in claim 8, wherein the metal of the divided extendible members is beryllium-copper alloy.

10. The extendible structure as set forth in claim 1, wherein the inner guide is in the shape of a pipe, with an inflator tube received therein, the extendible member is caused to extend by the inflator tube, which is forced to expand in the extension direction by means of gas pressure.

11. The extendible structure as set forth in claim 1, wherein each storage part is additionally provided with a wind-up drum that winds up the divided extendible member, a guide wall that supports the wind-up drum so as to be rotatable relative thereto, and root guide rollers that serve to pull out the divided extendible member from the wind-up drum.

* * * * *